UNITED STATES PATENT OFFICE.

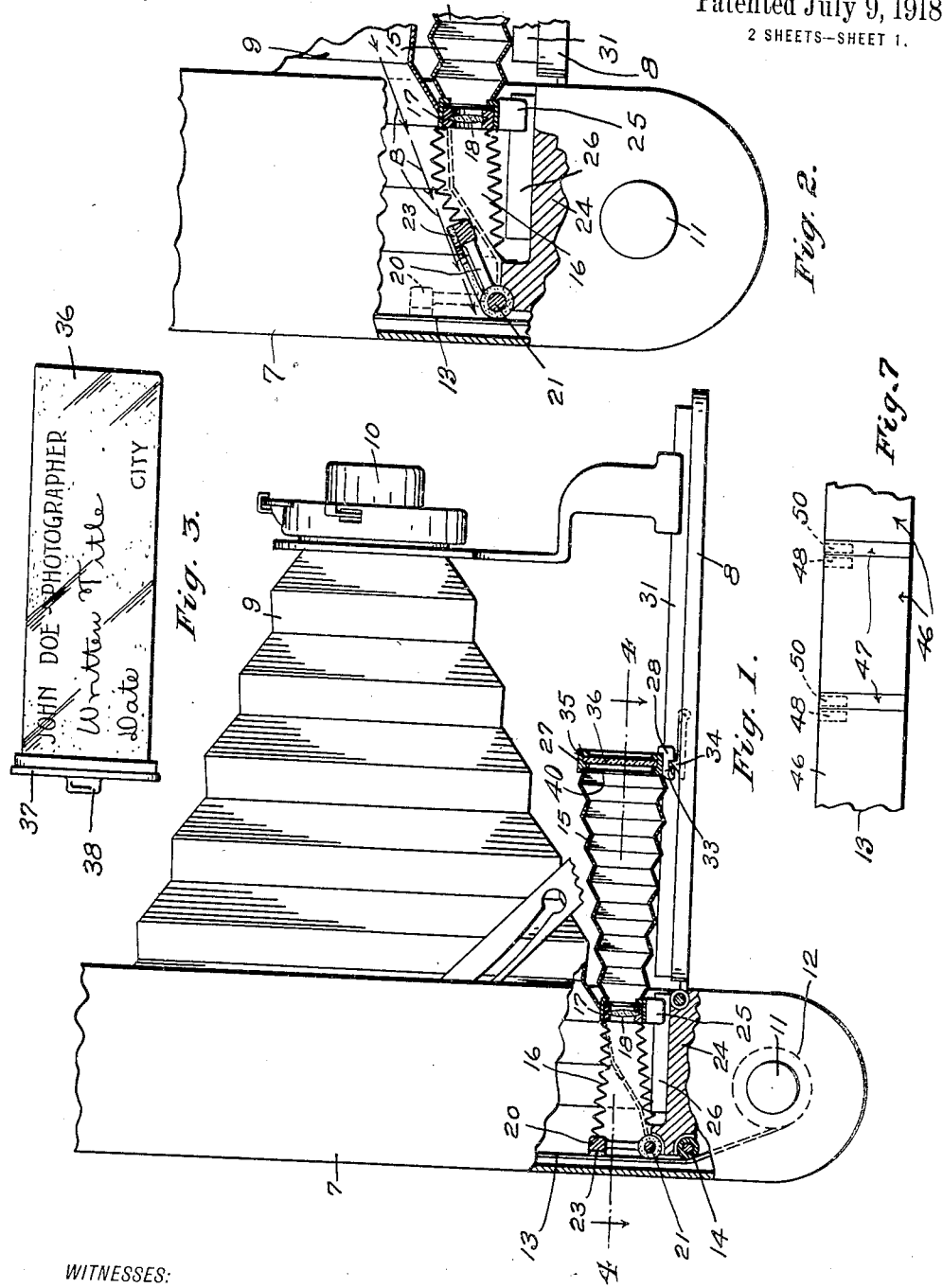

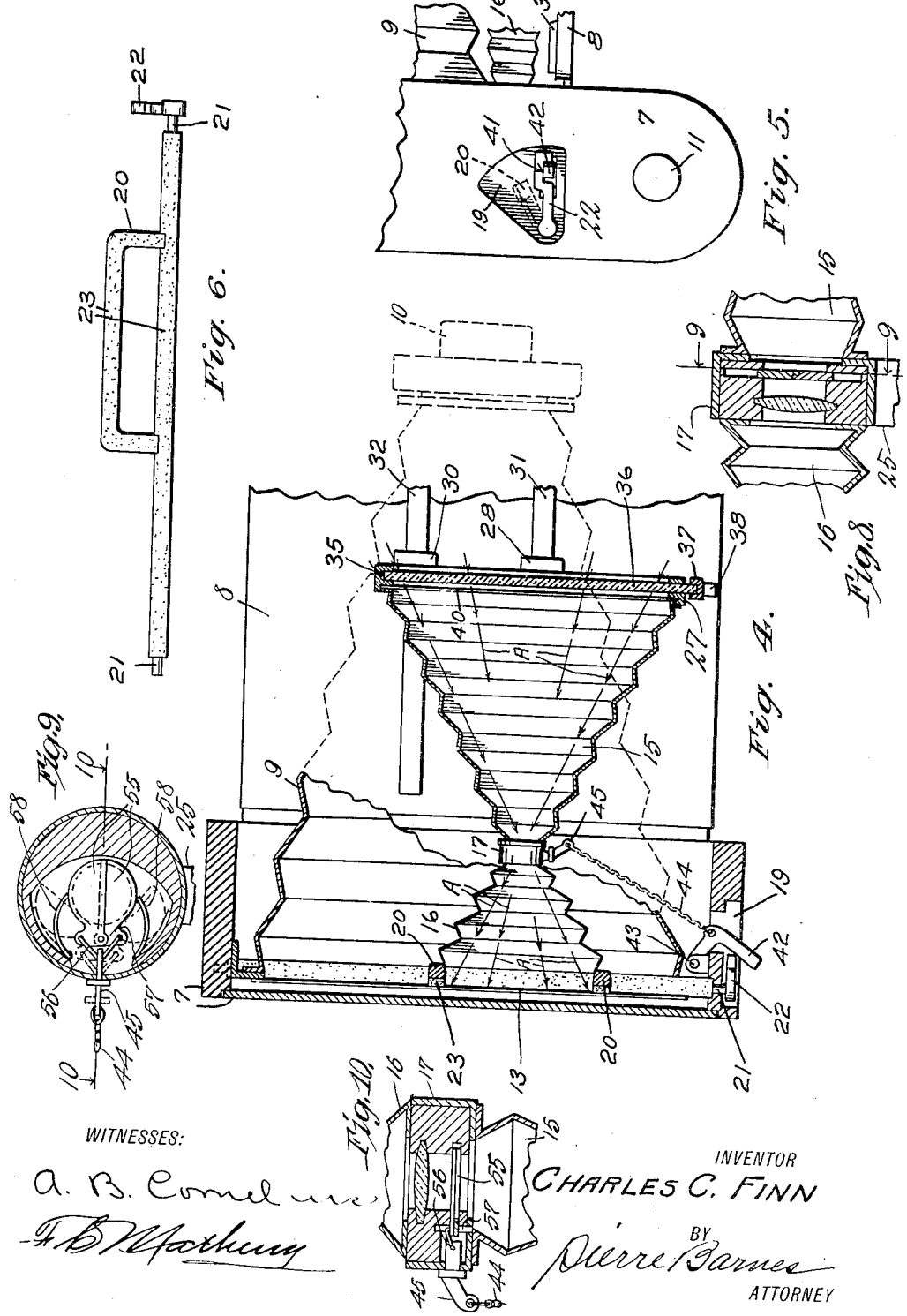

CHARLES C. FINN, OF SEATTLE, WASHINGTON.

AUTOGRAPHIC DEVICE FOR CAMERAS.

1,272,029.  Specification of Letters Patent.  Patented July 9, 1918.

Application filed April 27, 1916. Serial No. 93,848.

*To all whom it may concern:*

Be it known that I, CHARLES C. FINN, a citizen of the United States, residing at Seattle, in the county of King and State of Washington, have invented certain new and useful Improvements in Autographic Devices for Cameras, of which the following is a specification.

This invention relates to improvements in autographic devices for cameras and the object of this improvement is to provide a cheap and simple device that may be easily installed on any ordinary type of camera in such manner that it may be operated to make an exposure on a film of any desired inscription, as the name of the photographer, title of the picture, date of exposure and the like.

A further object is to provide apparatus whereby the same inscription may be exposed successively on a plurality of films without rewriting such inscription for each separate film.

Still further objects are to provide apparatus that may be folded in such a manner that it will not obscure any portion of the area of a film when the autograph feature is not in use and to so arrange said apparatus that it will preclude the possibility of any moisture entering therethrough and coming in contact with the film.

The invention consists in the novel construction of autographic devices, and the adaptation and combination of such devices with a camera, as will be more fully described in the following specification, illustrated in the accompanying drawings, and finally pointed out in the appended claims.

In the drawings, Figure 1 is a view in vertical cross-section of my device as it may appear when installed on a camera, the principal parts of the camera being shown in elevation; Fig. 2 is a similar view on an enlarged scale of the device, certain parts being shown in a different position; Fig. 3 is a plan view of an autograph plate used in the invention; Fig. 4 is a sectional view substantially on broken line 4—4 of Fig. 1; Fig. 5 is a fragmentary view in side elevation of a camera illustrating a detail of the invention; Fig. 6 is an enlarged plan view of a detail of the invention, Fig. 7 is a somewhat diagrammatic view illustrating different locations where an autograph may be placed on a film; Fig. 8 is a longitudinal sectional view on an enlarged scale, of the shutter mechanism shown in Figs. 1 and 2; Fig. 9 is a cross-sectional view on line IX—IX of Fig. 8, and Fig. 10 is a horizontal sectional view on line X—X of Fig. 9.

Referring to the drawings, throughout which like reference numerals indicate like parts, the numeral 7 indicates the outer casing of a camera of well-known type that is provided on its front side with a hinged door or cover-plate 8 and carries extensible bellows 9 of the usual form that is provided on its forward end with the customary lens and shutter apparatus 10.

One end of the casing 7 is provided with suitable pins, as indicated at 11, for the reception of a roller 12 whereon is wound a film 13 that passes over an idler roller 14, thence along the back of the camera to the opposite end thereof where it is secured to another roller, not shown, whereon it may be wound.

All of the above described parts may be of any well-known standard form of construction.

The autographic device that forms the subject of this invention comprises two small bellows 15 and 16 normally disposed below the camera bellows 9 with their smaller ends in substantially abutting positions and connected with opposite sides of a shutter housing 17 wherein is mounted a lens 18, the lens 18 being adapted to permit the passage of light from the bellows 15 into the bellows 16 when the shutter within the housing 17 is opened.

The bellows 16 are telescoped into the bottom side of the camera bellows 9, as shown in Figs. 1 and 2, and the top and side edges thereof are secured at the rear end to a rectangular frame 20 (see Fig. 6), the lowermost side of which is formed by a rod 21 that extends transversely of the camera casing 7 and is journaled therein at either end.

One end of the rod 21 is provided with a lever arm 22 whereby the rod may be oscillated to tilt the frame 20 from the position shown in Fig. 1 to the position shown in Fig. 2 and vice versa, and the rod 21 and frame 20 are each provided with a soft back padding 23, preferably of black felt, that is adapted to form a light-proof contact with the film 13 when the frame 20 is in an upright position.

The bottom side of the bellows 16 at the rear end thereof is secured to a plate 24 that forms the bottom of the housing for the camera-bellows 9 so that the bellows 15 and the bellows 16 may fold up into a small space below the camera-bellows 9 when the camera is not in use.

The connections between the large bellows 9 and small bellows 16 at the point where the latter telescopes into the former, are necessarily light-proof and substantial so that they will not be separated by the repeated folding and unfolding of the bellows.

The shutter mechanism 17 is provided with a downwardly directed guide 25 that slides on a track 26 on the plate 24. The outer end of the bellows 15 is secured to a rectangular frame 27 having two downwardly projecting guides 28 and 30 that slide on trackways 31 and 32 on the camera door 8 and one of the guides 28 is provided with a notch 33 for the reception of a spring pressed hook 34 whereby the bellows 15 and 16 may be held in a fixed extended position.

The frame 27 is provided with grooves 35 for the reception of the edges of a translucent plate 36 preferably of ground glass, whereon any desired inscription may be written or printed, the end of the plate 36 being provided with a cross-bar 37 having a finger-hold 38 formed thereon whereby it may be easily removed from and inserted in the frame 27.

40 is a transparent plate of any suitable material that is secured within the frame 27 just inside the plate 36 to prevent dirt and moisture from gaining access to the interior of the bellows 15.

The outer end of the lever arm 22 is notched, as at 41, for the reception of the end of a bell-crank lever 42 that is pivoted at 43 and is connected by flexible connector 44 with a trip arm 45 that operates a shutter within the shutter housing 17, the notch 41 in the end of the lever-arm 22 serving to lock the bell-crank lever 42 as shown in Fig. 5, when the frame 20 is inclined forwardly as shown in Fig. 2, thus precluding the possibility of admitting light through the bellows 16 except when the frame 20 is in contact with the film.

The shutter construction within the housing 17 is shown in detail by Figs. 9 and 10, the trip arm being connected to the semicircular hinged shutters 55 by the members 66. The shutters are hinged on the pin 57 and have their straight edges adjacently positioned when closed as indicated in Fig. 9, the shutters being held in closed position by the springs 58 fixed to the interior of the housing 17 and engaging the outer curved faces of the shutters. The operation of the shutter is caused by shifting the bell crank 42, as is evident from an inspection of Figs. 4, 9 and 10.

The lever arm 22 is preferably set within a recess 19 in the camera casing 7 so that it will be out of the way and will not catch on objects that rub against the camera.

In Fig. 7 I have shown a fragmentary plan view of a film 13 of the usual type, as it may appear after it has been developed, and before it has been cut up, the exposed areas of the pictures being designated by 46 and the space separating adjacent pictures being designated by 47.

If the operator wishes the title to appear within the boundaries of the picture, as illustrated at 48, the film is turned into the correct position, the frame 20 is turned upwardly into contact with the film, the exposure of the pictures is made, and then the exposure of the title is made. But if the operator desires the title to appear on the border portion, as illustrated at 50, the exposure of the picture is made while the frame 20 is turned down, the film is then moved the slight distance between the position indicated at 48 and the position indicated at 50, the frame is turned up, and the exposures of the title are made on the border space 47. When the films are cut apart, the cutting may be done so that the title is left attached to the correct film.

Where the film is developed and cut by a person other than the photographer who took the pictures, it is advantageous to expose the title within the boundaries of the film, as indicated at 48, thereby precluding all danger of the films being cut apart in such manner that the titles are attached to the wrong films.

In operation, the device is extended, as shown in Fig. 1, and the frame 20 is turned upwardly into contact with the film 13 so that when the exposure for the picture is made, the light will be excluded from the portion 48 of film within the frame 20.

The desired inscription is then written on the plate 36, the plate 36 is inserted in the frame 27 and the bell-crank lever 41 is moved outwardly, as shown in Fig. 4, to open the shutter in the housing 17 and permit light to pass through the plate 36 and thence through the lens 18 and strike upon the film 13, as indicated by arrows A, thus making an exposure on a reduced scale of the inscription that is written on the plate.

If a plurality of pictures relating to the same subject are taken on the same date, the inscription on the name plate will remain unchanged, it being only necessary to make an exposure through the name plate 36 each time the operator wishes to autograph a film.

If the film is not to be titled, or the title is to appear in the marginal space 50, the frame 20 is inclined forward into the position shown in Fig. 2, where it will be out of the line of the lowermost rays of light that enter through lens 10, as indicated by arrows B and will permit the entire film area to be exposed for the picture.

For the purpose of this description, the bellows 15 and 16 have been considered as two separate bellows, but it is obvious that they may be considered as one bellows with a lens and shutter mechanism interposed between the two ends thereof.

The term "film" herein used, will be held to include plates, films, and all other sensitized surfaces on which exposures for pictures may be made.

What I claim and desire to protect by Letters-Patent is—

1. The combination with a folding camera having a main substantially pyramidal bellows and adapted for the reception of a film, of an auxiliary smaller bellows adjacent the base of said pyramidal bellows, means for making light-proof contact between said film and the inner end of said auxiliary bellows, a translucent autograph plate associated with the outer end of said auxiliary bellows, and a shutter interposed in said auxiliary bellows between said autograph plate and said film.

2. The combination with a film roll-holding folding camera having a main substantially pyramidal bellows, of an auxiliary smaller bellows adjacent the base of said pyramidal bellows, means for making light-proof contact between one end of said auxiliary bellows and said film, another auxiliary bellows, shutter mechanism interposed between said first named auxiliary bellows and said last named auxiliary bellows, and a translucent plate for said last named auxiliary bellows, said plate being adapted to have an inscription inscribed thereon to be projected within the field of the main bellows.

3. The combination with a folding camera having a main substantially pyramidal bellows and adapted for the reception of a film, of an auxiliary shorter bellows adjacent the base of said pyramidal bellows, means for making a light-proof contact between one end of said auxiliary bellows and said film to inclose a small area of said film, another auxiliary bellows disposed in alinement with said first named auxiliary bellows, a lens interposed between said two auxiliary bellows, a shutter for said lens, a plate for said last named bellows adapted to receive an inscription thereon, and means for operating said shutter to permit the inscription on said plate to be exposed on said film within the field of the main bellows.

4. The combination with a camera having a bellows and adapted for the reception of a film, of an auxiliary bellows, a frame connected with the inner end of said bellows and adapted to make light-proof contact around a small area on said film, means for tilting said frame away from said film, a translucent autograph plate removably associated with the outer end of said bellows, a shutter interposed between said autograph plate and said frame, means for opening said shutter, and means for preventing the opening of said shutter when said frame is inclined away from said film.

5. The combination with a camera adapted for the reception of a film, of a tiltable frame having a padding of soft material adapted to make a light-proof contact with a film, means for tilting said frame, a bellows secured to said frame, another bellows disposed in alinement with said first-named bellows, shutter mechanism interposed between said two bellows, a plate removably associated with said last-named bellows and adapted to have an inscription placed thereon, and means for operating said shutter mechanism to permit an inscription on said plate to be exposed on said film.

6. The combination with a camera having a bellows and adapted for the reception of a film, of a tiltable frame within said camera, said frame having a padding of soft material adapted to engage said film, a secondary bellows telescoped within said camera bellows and having its edges secured to said frame, an autograph plate associated with said secondary bellows, a lens in said secondary bellows, and means for admitting light through said autograph plate and said lens to fall upon the portion of said film within said frame.

7. The combination with a camera having a bellows and adapted to receive a film, of a tiltable frame within said camera, said frame having a padding of soft material to engage with a film in said camera, means for adjusting the inclination of said frame, a smaller bellows telescoped within said camera bellows and connected with said frame, and means for controlling the admission of light to said smaller bellows.

8. The combination with a camera having a bellows adapted for the reception of a film, of a transverse shaft, a rectangular frame secured on said shaft, means for turning said shaft to vary the angle of inclination of said frame, padding of soft material for said frame and said shaft, a smaller bellows adapted to telescope within said camera bellows and secured at its inner end to said frame, a lens and shutter mechanism provided on the forward end of said smaller bellows, another smaller bellows connected with said lens and shutter mechanism and extending outward in diverging relation thereto in substantial alinement with said first-named smaller bellows, a transparent plate in the forward end of said last-named smaller bellows, an autograph plate removably associated with the forward end of said last-named smaller bellows, means for opening the shutter in said shutter mechanism, and means for preventing the opening of said shutter when said frame is in an inclined position.

9. The combination with a folding camera having a substantially pyramidal bellows through which a picture may be projected onto a sensitized film, of a second smaller and shorter bellows adjacent the base of said pyramidal bellows and through which an inscription may be projected on said film, said bellows being connected and arranged with respect to each other so that the inscription will be projected on the film within the field of the first named bellows.

Signed at Seattle, Washington, this 28th day of March, 1916.

CHARLES C. FINN.

Witnesses:
 E. PETERSON,
 A. L. BOWEN.